(12) United States Patent
Yan et al.

(10) Patent No.: US 12,328,016 B2
(45) Date of Patent: Jun. 10, 2025

(54) POWER SUPPLY DEVICE AND METHOD

(71) Applicant: AMBIT MICROSYSTEMS (SHANGHAI) LTD., Shanghai (CN)

(72) Inventors: Yu-Hu Yan, New Taipei (TW); Ming-Feng Liu, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 0 days.

(21) Appl. No.: 18/229,692

(22) Filed: Aug. 3, 2023

(65) Prior Publication Data
US 2025/0047108 A1 Feb. 6, 2025

(51) Int. Cl.
*H02J 7/00* (2006.01)
*H02J 7/34* (2006.01)

(52) U.S. Cl.
CPC .......... *H02J 7/0013* (2013.01); *H02J 7/0025* (2020.01); *H02J 7/0048* (2020.01); *H02J 7/0068* (2013.01); *H02J 7/342* (2020.01)

(58) Field of Classification Search
CPC ......... H02J 7/0013–0025; H02J 7/0031; H02J 7/0048; H02J 7/0063; H02J 7/0068; H02J 7/342; B60L 58/12–15; B60L 58/18–22
See application file for complete search history.

(56) References Cited

U.S. PATENT DOCUMENTS

| | | | | |
|---|---|---|---|---|
| 6,181,100 B1* | 1/2001 | Shoji | ..................... | H02J 7/0048 320/103 |
| 2004/0178766 A1* | 9/2004 | Bucur | ................... | H02J 7/0069 320/112 |
| 2004/0263118 A1* | 12/2004 | Breen | ................... | H02J 7/0013 320/116 |
| 2006/0075266 A1* | 4/2006 | Popescu-Stanesti | ......................... | H02J 7/0068 713/300 |
| 2010/0244782 A1* | 9/2010 | Nagayama | ............... | H02J 7/342 180/65.29 |
| 2014/0070756 A1 | 3/2014 | Kearns et al. | | |
| 2015/0002073 A1* | 1/2015 | Ju | ......................... | H02J 7/0025 320/103 |
| 2018/0191185 A1* | 7/2018 | Al Rasheed | ............ | H02J 7/342 |

(Continued)

FOREIGN PATENT DOCUMENTS

CN 214756842 11/2021
CN 217984557 12/2022

(Continued)

*Primary Examiner* — Rexford N Barnie
*Assistant Examiner* — David A Shiao
(74) *Attorney, Agent, or Firm* — ScienBiziP, P.C.

(57) ABSTRACT

A power supply device includes a first battery and a second battery, and a first switching unit, configured to select the first battery to supply power to a load; a second switching unit, configured to select the second battery to supply power to the load; a processing unit, configured to detect power of the first battery and the second battery; when the power of the second battery is greater than a first preset value, the processing unit disconnects the first switching unit and turns on the second switching unit to enable the second battery to supply power to the load; the processing unit controls the second battery to charge the first battery when the power of the first battery is less than a second preset value; and when the power of the first battery is greater than a third preset value, the second battery stops charging the first battery.

10 Claims, 6 Drawing Sheets

(56) References Cited

U.S. PATENT DOCUMENTS

| | | | |
|---|---|---|---|
| 2019/0052119 A1* | 2/2019 | Hendrix | H02J 7/0018 |
| 2021/0159548 A1* | 5/2021 | Deng | H02P 7/00 |
| 2021/0175479 A1* | 6/2021 | Sprague | H02K 11/0094 |
| 2021/0237670 A1* | 8/2021 | Takahara | H02J 9/06 |
| 2021/0291688 A1* | 9/2021 | Hirose | B60L 50/50 |
| 2021/0384739 A1* | 12/2021 | Wang | H02J 7/0063 |
| 2022/0344965 A1* | 10/2022 | Saito | H02J 7/0068 |
| 2023/0018561 A1* | 1/2023 | Gopalakrishnan | B60L 58/21 |
| 2023/0019766 A1* | 1/2023 | Mhere | H02J 7/0068 |
| 2023/0268762 A1* | 8/2023 | Kwon | H02J 7/0013 |
| | | | 320/103 |
| 2024/0106260 A1* | 3/2024 | Lin | H02J 7/00306 |

FOREIGN PATENT DOCUMENTS

| | | |
|---|---|---|
| TW | M557480 U | 3/2018 |
| TW | I771899 B | 7/2022 |
| TW | M638005 U | 2/2023 |

* cited by examiner

POWER SUPPLY DEVICE AND METHOD

FIELD

The present disclosure relates to a field of power supply technology, in particular to a power supply device and method.

BACKGROUND

AR/VR is a technology that major manufacturers are vigorously developing today. In addition to the software and hardware performance of the platform, whether it is AR glasses or VR head displays, in order to ensure that the use of product is not limited by wires, battery life is also a performance of great concern to users. However, in order to increase the use time of the product, it is necessary to increase the power that the battery can provide to the product, which also means that the weight on the user's head is heavier, which will cause an increase in user discomfort. Therefore, how to make products lightweight for users and improve power supply efficiency to achieve a longer endurance time has become one of the development goals of manufacturers.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
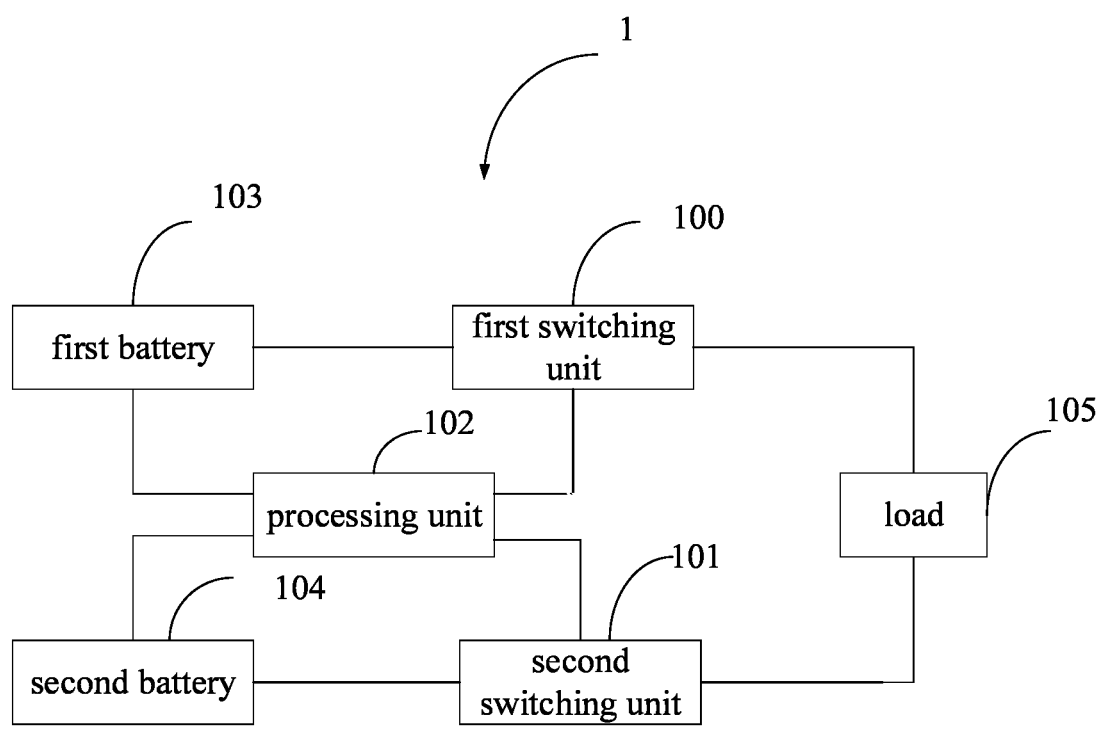
FIG. 1 is a module schematic diagram of an embodiment of a power supply device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Referring to FIG. 1, FIG. 1 is a module schematic diagram of an embodiment of a power supply device 1 of the present disclosure. The power supply device 1 is applied to wearable devices, especially AR/VR devices. In the embodiment, the power supply device 1 may include a first switching unit 100, a second switching unit 101, a processing unit 102, a first battery 103, a second battery 104, and a load 105.

The first switching unit 100 is electrically connected between the first battery 103 and the load 105, and is configured to select the first battery 103 to supply power to the load 105. The second switching unit 101 is electrically connected between the second battery 104 and the load 105, and is configured to select the second battery 104 to charge the load 105. The processing unit 102 is electrically connected to the first battery 103, the second battery 104, the first charging unit 101, and the second charging unit 102, and the processing unit 102 is configured to detect the power of the first battery 103 and the second battery 104.

When the power of the second battery 104 is greater than a first preset value, the processing unit 102 controls the first switching unit 100 to disconnect, the second switching unit 101 to turn on, so that the second battery 104 supplies power to the load 105. The processing unit 102 further detects the power of the first battery 103 at the same time. When the power of the first battery 103 is less than a second preset value, the processing unit 102 controls the second battery 104 to charge the first battery 103. When the power of the first battery 103 exceeds a third preset value, the processing unit 102 controls the second battery 104 to stop charging the first battery 103. The first preset value can be 10% of the capacity of the second battery 104, the second preset value can be 80% of the capacity of the first battery 103, and the third preset value can be 95% of the capacity of the first battery 103. The first preset value, second preset value, and third preset value can be set according to actual applications. For example, the second preset value set to 80% of the power of the first battery 103 is to ensure sufficient power of the first battery 103 in practical applications. However, when the power of the second battery 104 is less than a preset value, such as 40% of the capacity, the first battery 103 will no longer be charged and only the load 105 will be powered, with priority given to ensuring the power supply of the load 105.

In the embodiment, when the second battery 104 supplies power to the load 105, and the processing unit 102 detects that the power of the first battery 103 is less than the second preset value, the processing unit 102 controls the second battery 104 to charge the first battery 103.

In the embodiment, the first battery 103 is an internal battery. The second battery 104 is an external and replaceable battery. When the second battery 104 is discharged, it can be replaced with a new battery. When the second battery 104 is replaced, the power supply device 1 enters a battery replacement mode.

In the embodiment, the power supply device 1 may also include a reminder unit (not shown in the figure), and the reminder unit is electrically connected to the processing unit 102 and configured to generate a battery replacement reminder when the processing unit 102 detects that the power of the second battery 104 is less than the fourth preset value. The processing unit 102 is further configured to detect whether the second battery 104 is in the battery replacement mode. When the second battery 104 is in the battery replacement mode, the processing unit 102 controls the first battery 103 to supply power to the load 105.

When detecting that the power of the second battery 104 is less than the fifth preset value and the second battery 104 is not in the battery replacement mode, the processing unit 102 further controls the first battery 103 to supply power to the load 105. The fourth preset value can be 15% of the capacity of the second battery 104, and the fifth preset value can be 6% of the capacity of the second battery 104. It can be understood that the fourth and fifth preset values can be determined based on actual applications and are not limited here.

In the embodiment, the power supply device 1 may also include a battery replacement triggering unit (not shown in the figure). The battery replacement triggering unit is electrically connected to the processing unit 102 and the second battery 104, and configured to detect whether the second battery 104 has entered the battery replacement mode. When the second battery 104 is detected to enter the battery replacement mode, a triggering signal is issued. The processing unit 102 controls the first battery 103 to supply power to the load 105 according to the trigger signal. In other embodiments of the present disclosure, the battery replacement triggering unit can be integrated into the processing unit 102 without limitation.

The processing unit 102 is further configured to detect the power of the second battery 104 again when the battery replacement mode ends, that is, the processing unit 102 detects the power of the newly replaced second battery 104. When the power of the second battery 104 is greater than the first preset value, the processing unit 102 turns off the first switching unit 100, turns on the second switching unit 101 is connected, and restores the second battery 104 to supply power to the load 105. When the power of the second battery 104 is less than the fourth preset value, the processing unit 102 detects the power of the first battery 103; and when the power of the first battery 103 is greater than a sixth preset value, the processing unit 102 turns the first switching unit 100, disconnects the second switching unit 101, then the first battery 103 supplies power to the load 105. When the power of the first battery 103 is less than the sixth preset value, the power supply device 1 enters the shutdown mode. The sixth preset value can be 10% of the capacity of the first battery 103. It can be understood that the sixth preset value can be determined based on actual applications and is not limited here.

Figure 2:
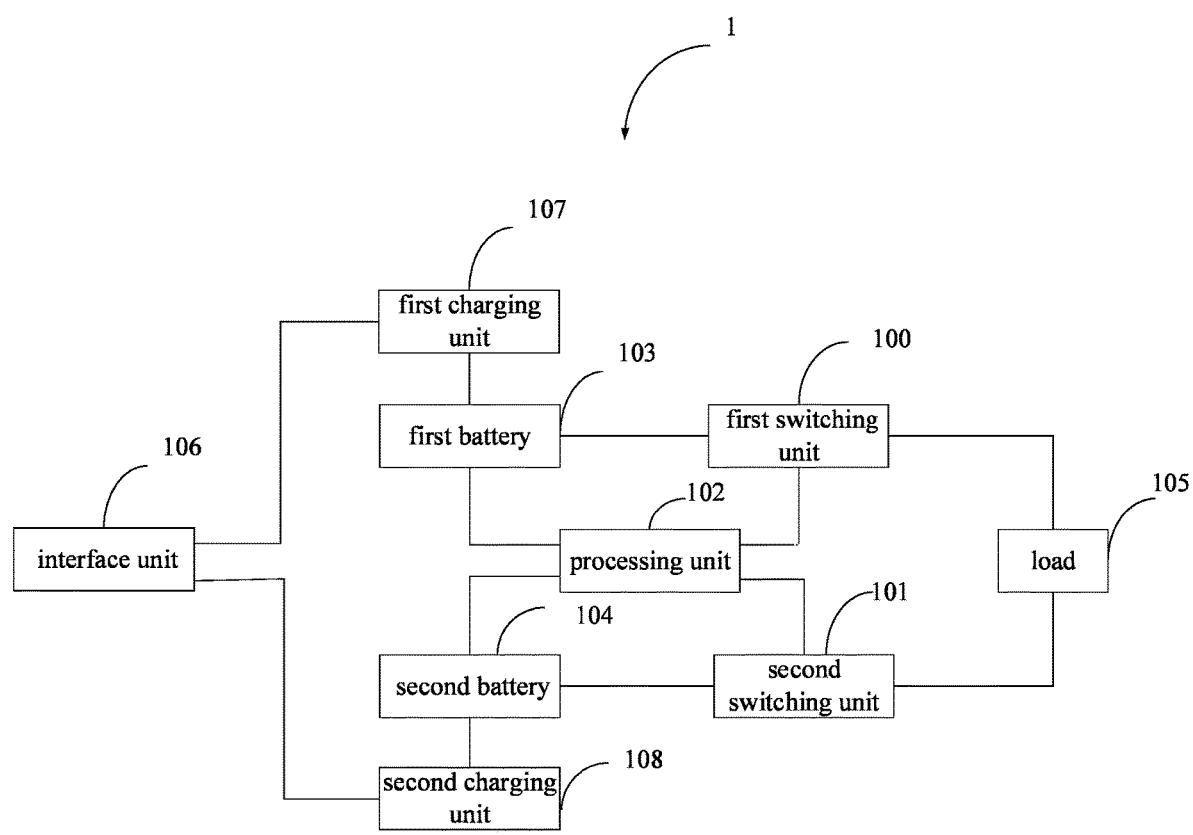
FIG. 2 is a module schematic diagram of another embodiment of the power supply device of the present disclosure.

FIG. 2 is a module schematic diagram of another embodiment of the power supply device 1 of the present disclosure. The difference between the power supply device 1 in the embodiment and the power supply device 1 in the above embodiment is that the power supply device 1 in the embodiment also includes an interface unit 106, a first charging unit 107, and a second charging unit 108. The working principles of the first switching unit 100, the second switching unit 101, the processing unit 102, the first battery 103, the second battery 104, and the load 105 are similar to the above embodiments, and will not be repeated here.

In the embodiment, the interface unit 106 is electrically connected to the load 105 and configured to connect an external power source. The first charging unit 107 is electrically connected to the interface unit 106 and the first battery 103 for charging the first battery 103. The second charging unit 108 is electrically connected to the interface unit 106 and the second battery 104 for charging the second battery 104.

In the embodiment, when the interface unit 100 is connected to an external power source, the external power supply supplies power to the load 105. When detecting that the second battery 104 is charging the first battery 103, the processing unit 102 controls the second battery 104 to stop supplying power to the first battery 103. Furthermore, the processing unit 102 detects the power of the first battery 103 and the second battery 104 respectively. When the power of the second battery 104 is less than the seventh preset value, the external power supply charges the second battery 104 through the second charging unit 108. When the power of the first battery 103 is less than the eighth preset value, the external power supply charges the first battery 103 through the first charging unit 107.

In the embodiment, the power supply device 1 also includes a power conversion unit (not shown in the figure), and the power conversion unit is electrically connected to the interface unit 106, the first charging unit 107, and the second charging unit 108, for converting voltage of the external power supply into a preset voltage value. In other embodiments, the power conversion unit can also be integrated into the interface unit 106, and is not limited here. When the second battery 104 supplies power to the load 105 and the power of the first battery 103 detected by the processing unit 102 is less than the second preset value, an OTG mode of the second charging unit 108 is activated to control the second battery 104 to charge the first battery 103. Specifically, before activating the OTG function of the second charging unit 108, the processing unit 102 controls the first charging unit 107 and the second charging unit 108 to disconnect from the power conversion unit, and then activates the OTG function of the second charging unit 108 to boost the voltage of the second battery 104 and supply to the first charging unit 107 to charge the first battery 103.

Figure 3:
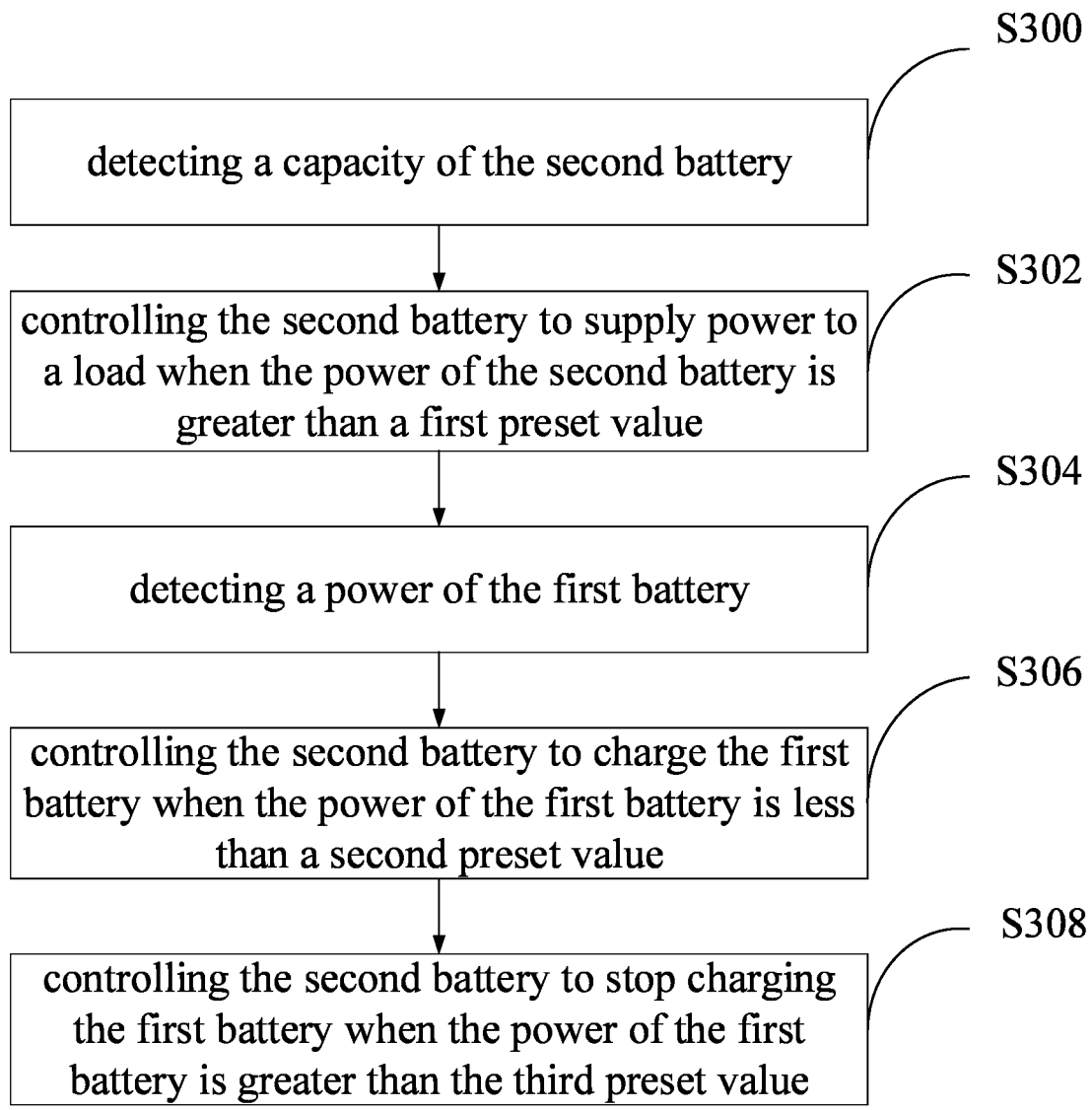
FIG. 3 is a flowchart illustrating an embodiment of the power supply method of the present disclosure.

Referring to FIG. 3, FIG. 3 is a flowchart illustrating an optional embodiment of the power supply method of the present disclosure. The power supply method is applied to the power supply device of the above embodiment. As shown in FIG. 3, the power supply method includes steps S300 to S308, wherein:

Step S300, detecting a power of the second battery 104.

Step S302, controlling the second battery 104 to supply power to a load 105 when the power of the second battery 104 is greater than a first preset value.

Step S304, detecting a power of the first battery 103;

Step S306, controlling the second battery 104 to charge the first battery 103 when the power of the first battery 103 is less than a second preset value;

Step S308, controlling the second battery 104 to stop charging the first battery 103 when the power of the first battery 103 is greater than the third preset value.

In the embodiment, the first preset value can be 10% of the capacity of the second battery 104, the second preset value can be 80% of the capacity of the first battery 103, and the third preset value can be 95% of the capacity of the first battery 103. The first preset value, second preset value, and third preset value can be set according to actual applications.

For example, the second preset value set to 80% of the capacity of the first battery 103 is to ensure sufficient power of the first battery 103 in practical applications. However, when the power of the second battery 104 is less than a preset value, such as 40% of the capacity of the second battery 104, the first battery 103 will no longer be charged and only the load 105 will be powered, with priority given to ensuring the power supply of the load 105.

Figure 4:
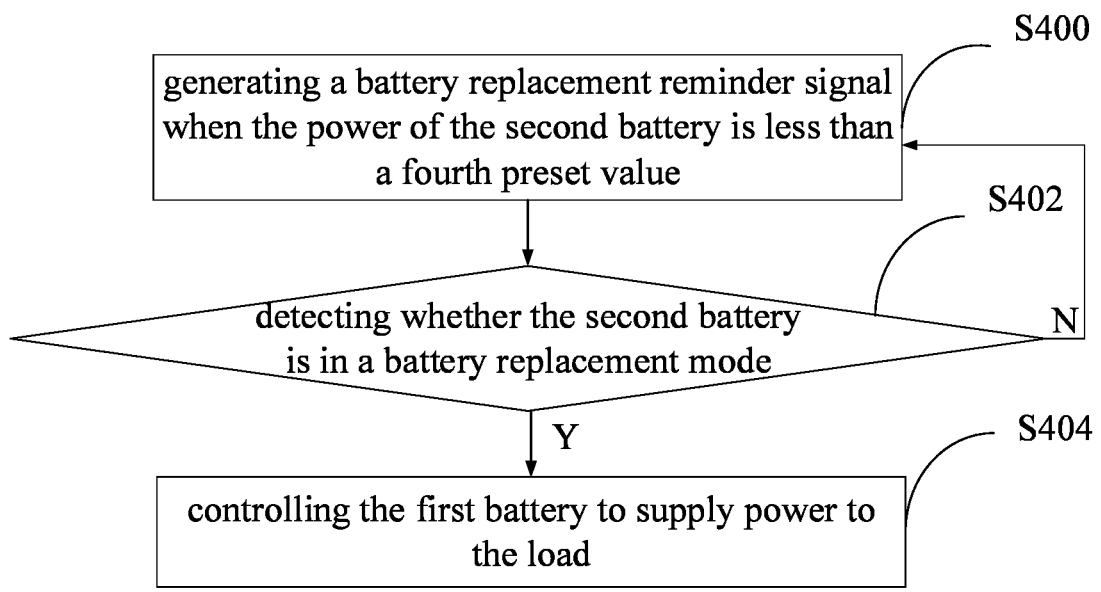
FIG. 4 is a flowchart illustrating another embodiment of the power supply method of the present disclosure.

Referring to FIG. 4, FIG. 4 is a flowchart illustrating an optional embodiment of the power supply method of the present disclosure. As shown in FIG. 4, the power supply method further includes steps S400~S404, wherein:

Step S400, generating a battery replacement reminder signal when the power of the second battery 104 is less than a fourth preset value.

Step S402, detecting whether the second battery 104 is in a battery replacement mode, if so, proceeding to step S404, and if not, returning to step S400 and continuing to generate the battery replacement reminder signal.

Step S404, controlling the first battery 103 to supply power to the load 105 when the second battery 104 is in the battery replacement mode.

Specifically, when the second battery 104 is not in the battery replacement mode and the power of the second battery 104 is less than the fifth preset value, the first battery 103 is controlled to supply power to the load 105. The fourth preset value can be 15% of the capacity of the second battery 104, and the fifth preset value can be 6% of the capacity of the second battery 104. It can be understood that the fourth and fifth preset values can be determined based on actual applications and are not limited here.

Figure 5:
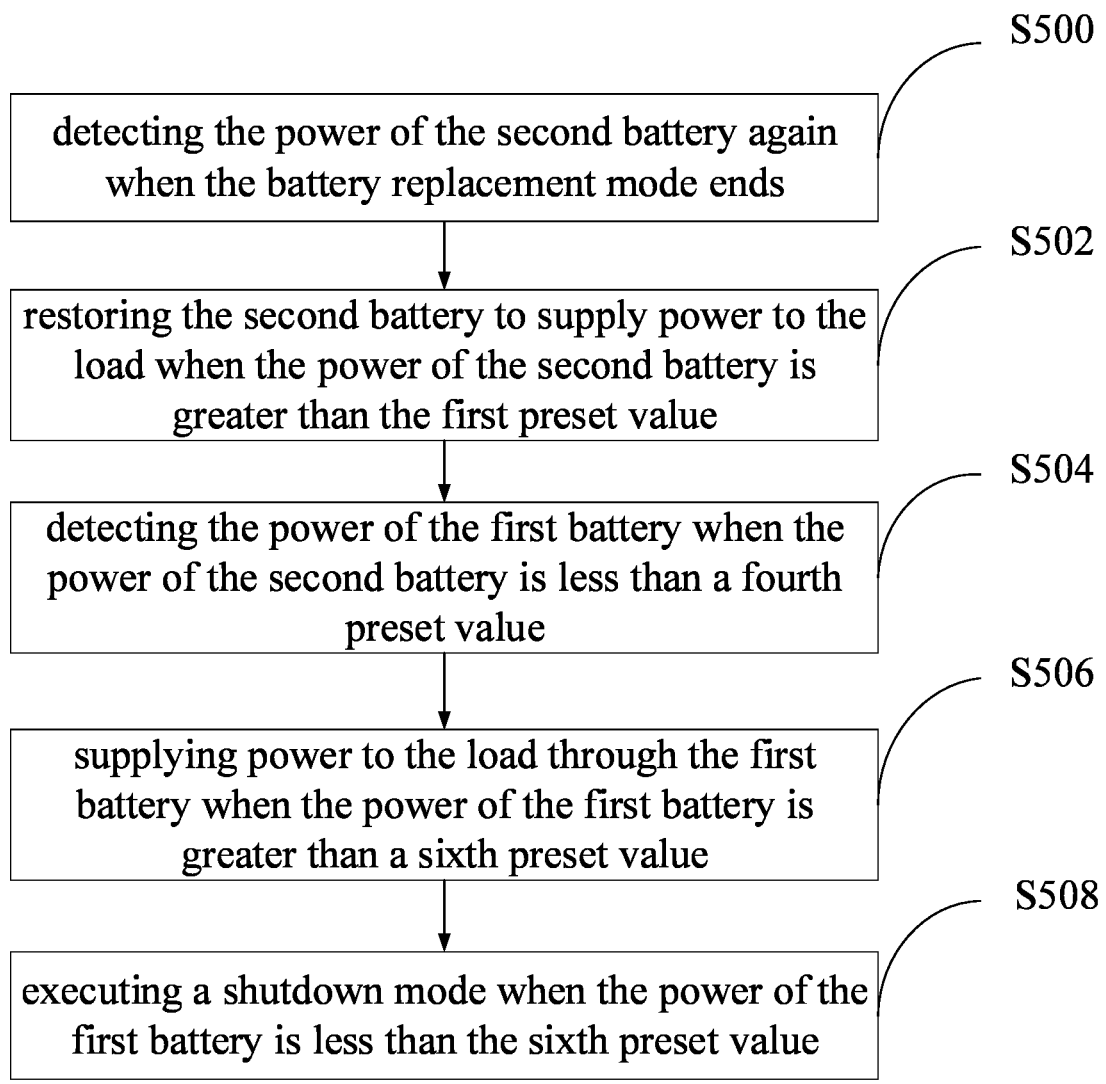
FIG. 5 is a flowchart illustrating another embodiment of the power supply method of the present disclosure.

Referring to FIG. 5, FIG. 5 is a flowchart illustrating an optional embodiment of the power supply method of the present disclosure. As shown in FIG. 5, the power supply method further includes step S500~S508:

Step S500, detecting the power of the second battery 104 again when the battery replacement mode ends.

Step S502, restoring the second battery 104 to supply power to the load 105 when the power of the second battery 104 is greater than the first preset value.

Step S504, detecting the power of the first battery 103 when the power of the second battery 104 is less than a fourth preset value.

Step S506, supplying power to the load 105 through the first battery 103 when the power of the first battery 103 is greater than a sixth preset value.

Step S508, executing a shutdown mode when the power of the first battery 103 is less than the sixth preset value.

In the embodiment, the sixth preset value can be 10% of the capacity of the first battery 103. It can be understood that the sixth preset value can be determined based on actual application and is not limited here.

Figure 6:
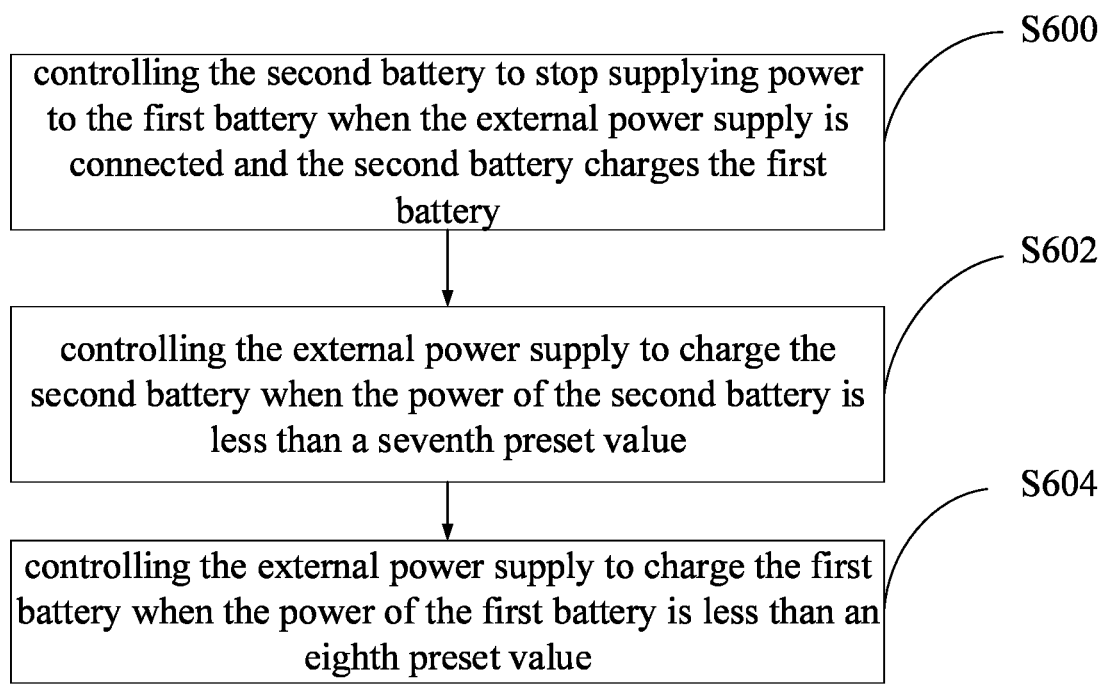
FIG. 6 is a flowchart illustrating another embodiment of the power supply method of the present disclosure.

Referring to FIG. 6, FIG. 6 is a flowchart illustrating an optional embodiment of the power supply method of the present disclosure. As shown in FIG. 6, when the external power supply is connected, the power supply method further includes Step S600~S604:

Step S600, controlling the second battery 104 to stop supplying power to the first battery 103 when the external power supply is connected and the second battery charges the first battery;

Step S602, controlling the external power supply to charge the second battery 104 when the power of the second battery 104 is less than a seventh preset value;

Step S604, controlling the external power supply to charge the first battery 103 when the power of the first battery 103 is less than an eighth preset value.

Compared to the prior art, the power supply device provided by the embodiment of the present disclosure is equipped with a first battery and a second battery. The first battery is an internal battery, and the second battery is an external battery. The processing unit detects the power of the second battery, and when the power of the second battery exceeds a preset value, then the processing unit disconnects the first switching unit, turns on the second switching unit, so the second battery directly supplies power to the load without passing through the charging unit. Therefore, the charging efficiency is greatly improved. And when the power of the first battery is less than the second preset value, the second battery charges the first battery, and when the power of the first battery is greater than the third preset value, the second battery stops charging the first battery, ensuring sufficient power of the first battery. Therefore, in the event of a second battery failure or loss of power, the first battery can be used to supply power to improve the working stability of the device.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A power supply device, comprising a first battery and a second battery, the power supply device further comprising:
    a first switching unit, electrically connected between the first battery and a load, configured to select the first battery to supply power to the load;
    a second switching unit, electrically connected between the second battery and the load, configured to select the second battery to supply power to the load; and
    a processor, electrically connected to the first battery and the second battery, configured to detect a power of the first battery and a power of the second battery, wherein when the power of the second battery is greater than a first preset value, the processor controls the first switching unit to disconnect, and controls the second switching unit to turn on to enable the second battery to supply power to the load, simultaneously the processor further detects the power of the first battery, and controls the second battery to charge the first battery when the power of the first battery is less than a second preset value, when the power of the first battery is greater than a third preset value, the processor controls the second battery to stop charging the first battery, and when the power of the second battery is less than a preset value, the processor controls the second battery to no longer charge the first battery and only power the load.

2. The power supply device according to claim 1, further comprising a reminding circuit, wherein:
    the reminding circuit is electrically connected to the processor and is configured to generate a battery replacement reminder signal when the processor detects that the power of the second battery is less than a fourth preset value, and the processor is also configured to detect whether the second battery is in a battery replacement mode, and when the second battery is in the battery replacement mode, the processor controls the first switching unit to turn on, controls the second switching unit to disconnect, and enables the first battery to supply power to the load.

3. The power supply device according to claim 2, wherein the processor is further configured to control the first battery to supply power to the load when the power of the second battery is less than a fifth preset value and the second battery is not in the battery replacement mode.

4. The power supply device according to claim 2, wherein:
the processor is further configured to detect the power of the second battery again when the battery replacement mode ends,
the processor is further configured to disconnect the first switching unit, turn on the second switching unit, and restore the second battery to supply power to the load when the power of the second battery is greater than the first preset value,
the processor is further configured to detect the power of the first battery when the power of the second battery is less than the fourth preset value, and
the processor is further configured to turn on the first switching unit, disconnect the second switching unit to control the first battery to supply power to the load when the power of the first battery is greater than a sixth preset value, and control the power supply device to enter a shutdown mode when the power of the first battery is less than the sixth preset value.

5. The power supply device according to claim 1, further comprising:
an interface unit, electrically connected to the load and configured to connect to an external power source;
a first charging circuit, electrically connected to the interface unit and the first battery for charging the first battery;
a second charging circuit, electrically connected to the interface unit and the second battery for charging the second battery, wherein,
when the interface unit is connected to the external power supply, the load is supplied with power through the external power supply, and the processor is further configured to:
control the second battery to stop supplying power to the first battery when the second battery is detected to charge the first battery,
control the external power supply to charge the second battery through the second charging circuit when the power of the second battery is less than a seventh preset value, and
control the external power supply to charge the first battery through the first charging circuit when the power of the first battery is less than an eighth preset value.

6. A power supply method, applied to a power supply device, the power supply device comprising a first battery, a second battery, a first switching unit electrically connected between the first battery and a load, a second switching unit electrically connected between the second battery and the load, and a processor, electrically connected to the first battery, the second battery, the first switching unit and the second switching unit, and power supply method comprises:
detecting a power of the second battery by the processor;
controlling the first switching unit to disconnect and controlling the second switching unit to turn on by the processor to enable the second battery to supply power to the load when the power of the second battery is greater than a first preset value;
detecting a power of the first battery by the processor;
controlling the second battery to charge the first battery by the processor when the power of the first battery is less than a second preset value; and
controlling the second battery to stop charging the first battery by the processor when the power of the first battery is greater than a third preset value;
controlling the second battery to no longer charge the first battery and only power the load by the processor when the power of the second battery is less than a preset value.

7. The power supply method according to claim 6, further comprising:
generating a battery replacement reminder signal when the power of the second battery is less than a fourth preset value;
detecting whether the second battery is in a battery replacement mode; and
controlling the first battery to supply power to the load when the second battery is in the battery replacement mode.

8. The power supply method according to claim 7, further comprising:
controlling the first battery to supply power to the load when the power of the second battery is less than a fifth preset value and the second battery is not in the battery replacement mode.

9. The power supply method according to claim 7, further comprising:
detecting the power of the second battery again when the battery replacement mode ends;
restoring the second battery to supply power to the load when the power of the second battery is greater than the first preset value;
detecting the power of the first battery when the power of the second battery is less than a fourth preset value;
supplying power to the load through the first battery when the power of the first battery is greater than a sixth preset value; and
executing a shutdown mode when the power of the first battery is less than the sixth preset value.

10. The power supply method according to claim 6, wherein when connecting to an external power source, the method further comprises:
controlling the second battery to stop supplying power to the first battery when the second battery charges the first battery,
controlling the external power supply to charge the second battery when the power of the second battery is less than a seventh preset value, and
controlling the external power supply to charge the first battery when the power of the first battery is less than an eighth preset value.

* * * * *